(12) United States Patent
He (10) Patent No.: US 7,881,688 B1
(45) Date of Patent: Feb. 1, 2011

(54) METHOD AND APPARATUS FOR CONTROLLING A LOCAL OSCILLATOR

(75) Inventor: Runsheng He, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 623 days.

(21) Appl. No.: 11/864,003

(22) Filed: Sep. 28, 2007

Related U.S. Application Data (60) Provisional application No. 60/827,555, filed on Sep. 29, 2006.

(51) Int. Cl.
H04B 1/10 (2006.01)
(52) U.S. Cl. .................. 455/296; 455/310; 455/255
(58) Field of Classification Search .............. 455/255, 455/296, 302, 310, 313, 317
See application file for complete search history.

(56) References Cited

U.S. PATENT DOCUMENTS

| | | | | |
|---|---|---|---|---|
| 4,879,758 A * | 11/1989 | DeLuca et al. | ............... | 455/296 |
| 5,263,055 A * | 11/1993 | Cahill | ............... | 375/346 |
| 5,307,515 A * | 4/1994 | Kuo et al. | ............... | 455/295 |
| 5,325,204 A * | 6/1994 | Scarpa | ............... | 348/607 |
| 5,949,832 A * | 9/1999 | Liebetreu et al. | ............... | 375/344 |
| 5,963,856 A * | 10/1999 | Kim | ............... | 455/307 |
| 6,205,183 B1 * | 3/2001 | Dent | ............... | 375/261 |
| 6,389,273 B1 * | 5/2002 | Brandenburg | ............... | 455/296 |
| 6,542,724 B1 * | 4/2003 | Copeland et al. | ............... | 455/302 |
| 6,794,858 B2 * | 9/2004 | Ishii | ............... | 324/76.78 |
| 7,127,010 B1 * | 10/2006 | Parker | ............... | 375/344 |
| 7,499,694 B1 * | 3/2009 | Yeo et al. | ............... | 455/339 |
| 7,783,259 B2 * | 8/2010 | Dessert et al. | ............... | 455/63.1 |
| 2004/0062216 A1 * | 4/2004 | Nicholls et al. | ............... | 370/320 |
| 2004/0161062 A1 * | 8/2004 | Richey et al. | ............... | 375/344 |
| 2006/0269021 A1 | 11/2006 | Ibrahim et al. | | |
| 2008/0051053 A1 * | 2/2008 | Fedan | ............... | 455/296 |

* cited by examiner

*Primary Examiner*—Duc M Nguyen

(57) ABSTRACT

In a method for setting a local oscillator (LO) frequency in a receiver, a power level of an interfering signal corresponding to a harmonic of an LO signal is determined. The LO frequency is set based on the determined power level of the interfering signal.

29 Claims, 6 Drawing Sheets

METHOD AND APPARATUS FOR CONTROLLING A LOCAL OSCILLATOR

CROSS-REFERENCES TO RELATED APPLICATIONS

The present application claims the benefit of U.S. Provisional Application No. 60/827,555, entitled "INTELLIGENT LO FREQUENCY SELECTION," filed on Sep. 29, 2006, which is hereby incorporated by reference herein in its entirety.

FIELD OF TECHNOLOGY

The present disclosure relates generally to communication systems, and more particularly, to receivers that mix an information signal from a carrier frequency to a lower frequency.

DESCRIPTION OF THE RELATED ART

In many communication systems, an information signal is shifted to a much higher frequency (e.g., a radio frequency (RF)) for transmission. This higher frequency is sometimes referred to as a carrier frequency. In some systems, a radio frequency spectrum may be partitioned into a plurality of non-overlapping channels so that different information signals may be transmitted on the different channels and so that interference between information signals can be reduced or eliminated. In such systems, an information signal is shifted to its RF channel for transmission. Each RF channel may be defined by its center frequency and its bandwidth or its upper and lower frequencies, for example.

At a receiver, the transmitted information signal is shifted down from the carrier frequency so that it can be processed and the information recovered. In some receivers, the information signal is shifted to an intermediate frequency (IF) to generate an IF signal. Then, the IF signal may be processed and eventually a baseband information signal is generated. As is well known, the shifting of a signal to or from a carrier frequency may be accomplished by multiplying the signal by a sinusoid. This technique is often referred to as "mixing" the signal with a local oscillator (LO). In a receiver, the resultant signal is filtered with a low-pass filter to remove unwanted high frequency components.

It is also known that the shifting of a signal to or from a carrier frequency similarly may be accomplished by multiplying the signal by (or mixing it with) a square wave-type signal as opposed to a sinusoid. In the frequency domain, a square-wave signal is similar to a sinusoid, but with harmonics added (typically odd harmonics). Thus, when mixing with a square wave signal, unwanted interfering components corresponding to the harmonic frequencies of the square wave may be mixed down. Such interfering components may be other channels located at higher frequencies, for example.

Figure 1A:
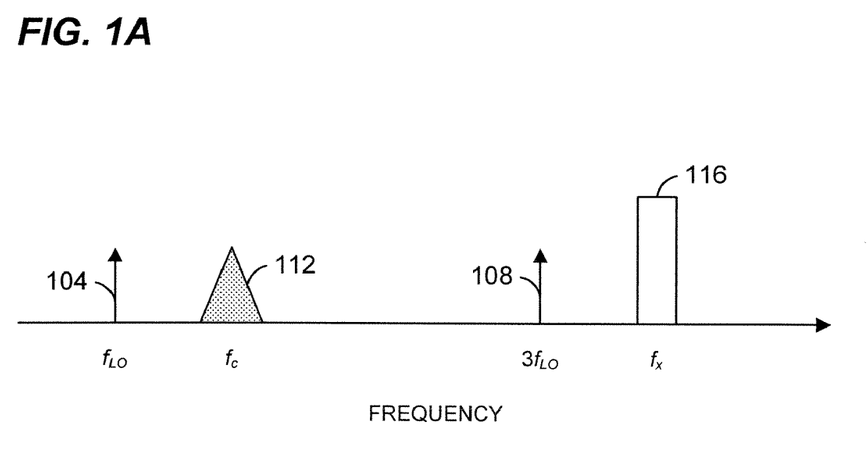
FIG. 1A is a signal diagram illustrating various example signals in the frequency domain prior to mixing in a receiver.

FIG. 1A is a signal diagram illustrating various example signals in the frequency domain prior to mixing. A mixing signal (e.g., a square wave-type signal) includes a primary component 104 at a local oscillator (LO) frequency $f_{LO}$ and a third harmonic component 108 at a frequency $3f_{LO}$. A desired information signal 112 is located in a desired channel at a frequency $f_c$, where $f_c=f_{LO}+f_I$ and $f_I$ is an intermediate frequency (IF) to which it is desired to shift the desired information signal. At a frequency $f_x$, where $f_x=3f_{LO}+f_I$, there may be another information signal 116 in some other channel.

Figure 1B:
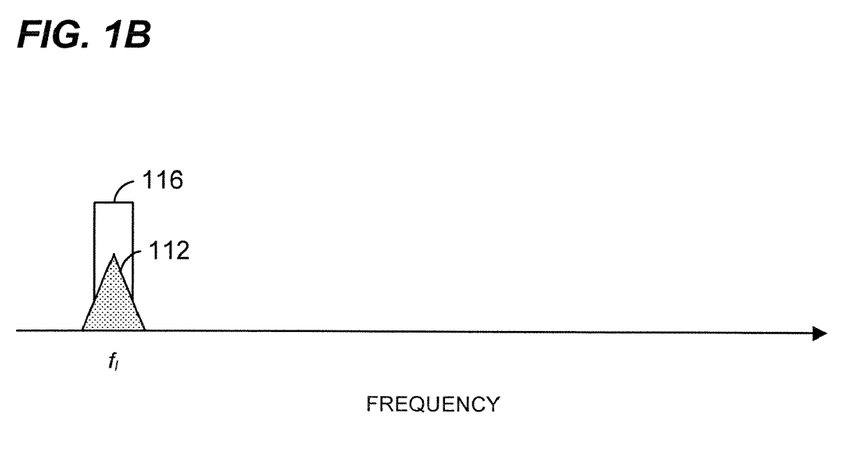
FIG. 1B is a signal diagram illustrating some of the signals in FIG. 1A after mixing in the receiver.

FIG. 1B is a signal diagram illustrating the signals of FIG. 1A after mixing. In particular, the desired signal 112 is now shifted to $f_I$ as a result of having been mixed with the primary component 104 of the LO signal. But the signal 116 was also shifted to $f_I$ as a result of having been mixed with the third harmonic component 108 of the LO signal. Thus, the unwanted signal 116 will interfere with the desired signal 112.

To avoid such interference, it is known to filter the received signal prior to mixing in order to attenuate the unwanted components. Referring to FIG. 1A, a filter could be used to attenuate signals such as the signal 116 prior to mixing, while passing desired signals such as the signal 112. However, in some communication systems it may be difficult to design or impractical to use a filter that will adequately reduce the interference. For instance, if the system utilizes channels over a relatively wide bandwidth, it may be necessary to utilize a tunable filter so that the receiver can receive all of the channels. Referring to FIG. 1A, for example, the same filter used when the signal 112 was desired to be received could not be used when it is desired to receive the signal 116 because this signal attenuated the signal 116. One solution may be to utilize a tunable filter, but it is known that tunable filters that can achieve the desired attenuation tend to be difficult to design and/or expensive to implement.

SUMMARY OF THE DISCLOSURE

In one embodiment, a method for setting a local oscillator (LO) frequency in a receiver includes determining a power level of an interfering signal corresponding to a harmonic of an LO signal, and setting the LO frequency based on the determined power level of the interfering signal.

In another embodiment, a receiver device comprises a mixer having a first input to receive an information signal, a second input to receive a local oscillator (LO) signal, and an output to provide an intermediate frequency (IF) signal. The receiver also comprises a LO signal generator coupled to the second input of the mixer, the LO signal generator having a control input to control a primary frequency of the LO signal. Additionally, the receiver comprises a controller coupled to the control input of the LO signal generator, the controller having an input to receive a power level indicator. The controller is configured to select an LO signal frequency based on a frequency of a desired signal and based on the power level indicator.

In yet another embodiment, a method for controlling a local oscillator (LO) frequency in a receiver includes receiving an indicator of a desired signal frequency, and receiving a power level indicator. The method additionally includes determining a local oscillator (LO) signal frequency based on the desired signal frequency and the power level indicator.

DETAILED DESCRIPTION

From the point of view of a receiver, some interfering signals may be at a higher power than others. The example methods and systems described below utilize this fact by adjusting a local oscillator (LO) frequency $f_{LO}$ in an attempt to find a frequency $f'_{LO}$ that corresponds to an interfering signal having an acceptable power level. For example, an acceptable power level may be a power level below which a filter of the receiver is typically able to adequately attenuate the interfering signal.

Figure 2A:
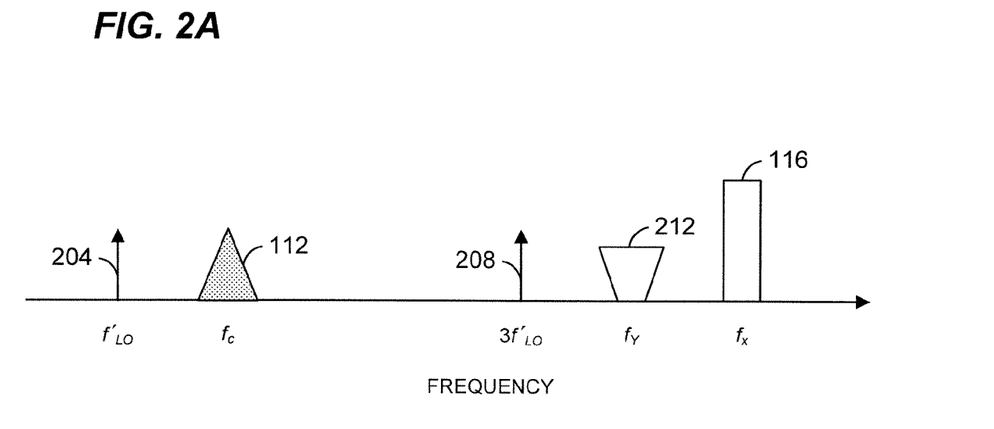
FIG. 2A is another signal diagram illustrating various example signals in the frequency domain prior to mixing.

FIG. 2A is a signal diagram illustrating various example signals in the frequency domain prior to mixing, including the desired signal 112 and the undesired signal 116 of FIGS. 1A and 1B. In FIG. 2A, the mixing signal is at an LO frequency $f'_{LO}$ which is different than the frequency $f_{LO}$ as shown in FIG. 1A. In particular, $f'_{LO}=f_{LO}-\Delta$, where $\Delta$ is a frequency difference. The mixing signal (e.g., a square wave-type signal) includes a primary component 204 at $f'_{LO}$ and a third harmonic component 208 at a frequency $3f'_{LO}$, where $3f'_{LO}=3f_{LO}-3\Delta$. The desired information signal 112 is located in a desired channel at a frequency $f_c$, where $f_c=f_{LO}+f_I$ and $f_I$ is an intermediate frequency (IF). After mixing, the desired information signal 112 will be shifted to a frequency $f'_I$, where $f'_I=f_I+\Delta$.

At a frequency $f_y$, where $f_y=3f'_{LO}+f_I$, there may be another information signal 212 in some other channel. But the undesired information signal 212 may have much less power than the undesired signal 216.

Figure 2B:
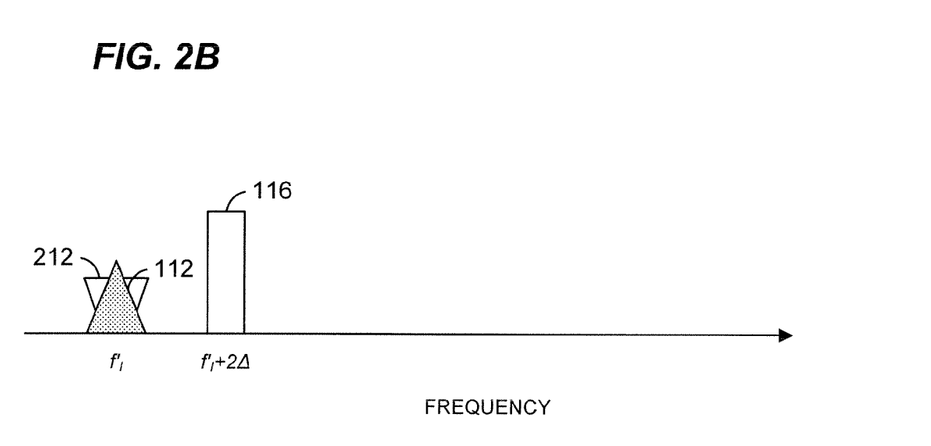
FIG. 2B is a signal diagram illustrating some of the signals in FIG. 2A after mixing.

FIG. 2B is a signal diagram illustrating the signals of FIG. 2A after mixing. In particular, the desired signal 112 is now shifted to $f'_I$ as a result of having been mixed with the primary component 204 of the LO signal. But the signal 212 was also shifted to $f''_I$ as a result of having been mixed with the third harmonic component 208 of the LO signal. Thus, the unwanted signal 212 may interfere with the desired signal 112. But the power of the signal 212 is much less than that of the signal 116 such that it may be possible to adequately attenuate the signal 212 with a filter prior to mixing and thus reduce or eliminate its interference with the desired signal 112.

As in FIG. 1A, the undesired information signal 116 is located at the frequency $f_x$, where $f_x=3f_{LO}+f_I$. Substituting for $f_{LO}$ and $f_I$, the frequency $f_x$ may be rewritten as $f_x=3f'_{LO}+3\Delta+f'_I-\Delta=3f'_{LO}+f'_I+2\Delta$. Thus, after mixing, the high power undesired signal 116 is shifted to a frequency $f'_I+2\Delta$ as shown in FIG. 2B. If $2\Delta$ provides adequate spacing between the desired channel 112 and the undesired high power signal 116 after mixing, it may be possible to apply a filter after mixing to further attenuate the undesired high power signal 116. For example, if $2\Delta$ is greater than or equal to the spacing between the center frequencies of channels and/or the bandwidth of each channel in the communication system, this may be adequate. Thus, the parameter $\Delta$ may be selected based on the desired spacing after mixing, and, at least in some implementations, the desired spacing may be based at least in part on the channel configuration of the system.

Figure 3:
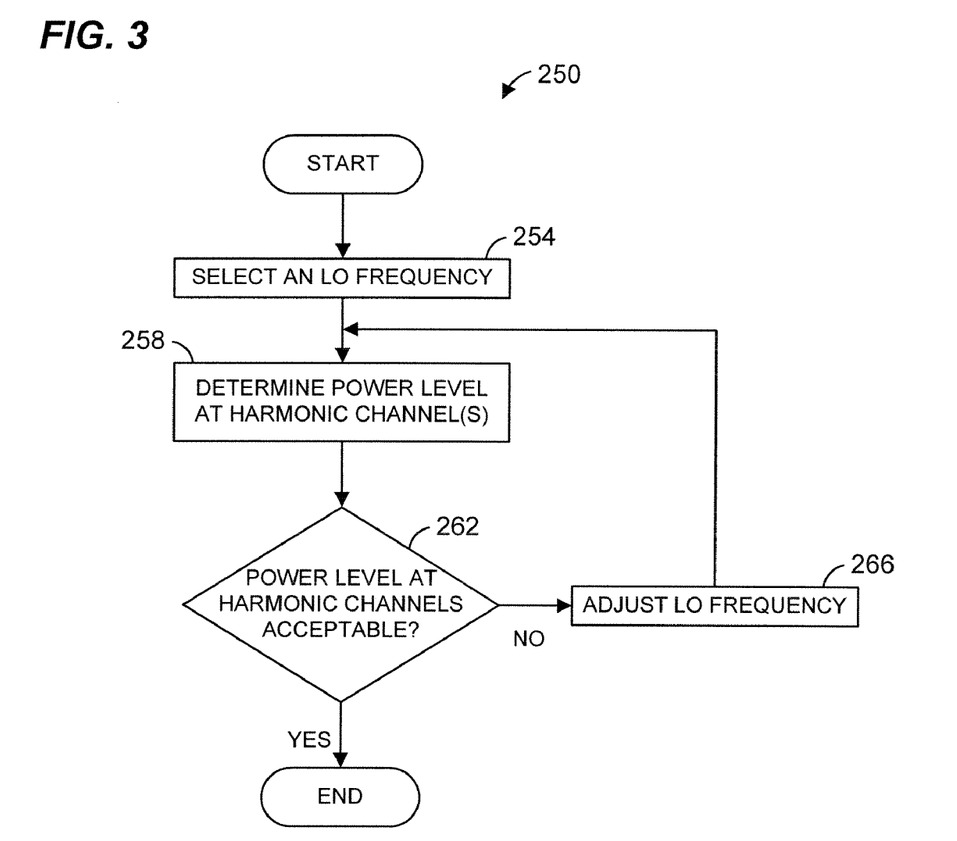
FIG. 3 is a flow diagram of an example method for determining a frequency of a local oscillator (LO) of a receiver.

In some implementations, a frequency of the LO may be selected so that interfering signals due to harmonics of the LO signal have less power as compared to interfering signals corresponding to other frequencies of the LO. FIG. 3 is a flow diagram of one example method 250 for determining a frequency of the LO.

At a block 254, an LO frequency may be selected. Selection of the LO frequency may be performed in a variety of ways. For example, there may be a set of possible LO frequencies from which to choose, and selection of the LO frequency may comprise randomly or pseudo-randomly selecting one of the frequencies from the set. As another example, a predetermined frequency may be selected from the set, such as a lowest frequency, a highest frequency, or some other frequency from the set. Selection of the LO frequency may comprise selecting a particular setting or configuration of the LO that results in an LO signal being generated at a certain frequency.

Because the LO frequency and the IF frequency are related (i.e., use of a particular LO frequency will result in the desired signal being shifted down to a particular IF frequency), selection of the LO frequency also results, in effect, in the selection of the IF frequency and vice versa. Thus, in at least some implementations, selection of the LO frequency may be equivalent to selection of the IF frequency.

At a block 258, power levels of interfering signals that will be shifted down to the IF frequency as a result of harmonics of the selected LO signal are determined. There may be one or more such interfering signals corresponding to one or more harmonics. The interfering signals for which power levels are determined may be based on one or more of the amplitudes or power levels of the harmonics, the attenuation level of a pre-mixing filter at the frequency ranges of the interfering signals, etc. For example, if the amplitude of a particular LO signal harmonic is relatively low, it may be decided in advance that an interfering signal corresponding to the harmonic may not, in effect, cause noticeable interference. Thus, it may not be necessary to determine the power level of this interfering signal. Similarly, a pre-mixing filter may adequately attenuate a particular interfering signal such that it does not cause noticeable interference. Thus, it may not be necessary to determine the power level of this interfering signal.

In a system utilizing channels, the channels that may be shifted to IF as a result of the LO signal harmonics may be referred to as harmonic channels. Thus, the block 258 may comprise determining power levels of the one or more harmonic channels.

If there are a plurality of interfering signals, determining the power level may include determining a cumulative interfering power level. Determining a cumulative power level may optionally include determining a weighted accumulation. For example, it may be known that some interfering signals will be attenuated by a pre-mixing filter more than others. Thus, some interfering signals may contribute more to the accumulated interfering power level than others after the pre-mixing filter.

Determining a power level, which may be a cumulative power level, of an interfering signal (or a plurality of interfering signals in the case of a cumulative power level) may include calculating a ratio of the power level of the desired signal to the power level of the interfering signal(s).

Determining a power level of an interfering signal (e.g., harmonic channel) may include temporarily changing the LO frequency such that the interfering signal (e.g., harmonic channel) becomes the desired channel for purposes of estimating its power level. Determining a power level of the desired signal (e.g., desired channel) may include estimating its power level in the presence of interference due to the down-shifted interfering signal (e.g., harmonic channel). If the interference is relatively strong, the determined power level of the desired signal may be only a rough estimate. In fact, if the power of the down-shifted interfering signal is stronger than the power of the desired signal, the determined power of the desired signal may in fact be an estimate of the power of the interfering signal. Nonetheless, such rough or incorrect estimates may be acceptable for use in determining whether to adjust the LO frequency.

In some implementations, the power level of an interfering signal and/or the ratio of the power level of the desired signal to the power level of the interfering signal(s) may be inferred from an error rate measurement of the desired signal. For example, it may be inferred from a high error rate that an interfering signal resulting from a harmonic of the LO signal has an unacceptable power level. Thus, determining a power level of an interfering signal (e.g., harmonic channel) may include measuring an error rate of the desired channel. In fact, if the power of the down-shifted interfering signal is stronger than the power of the desired signal, the determined error rate may in fact be an error rate of the interfering signal. Nonetheless, such an incorrect error rate estimate may be acceptable for use in determining whether to adjust the LO frequency.

At a block 262, it may be determined if the one or more power levels determined at the block 258 are acceptable. Determining if the power level(s) is (are) acceptable may include comparing a power level, cumulative power level, power level ratio, etc., to a threshold. If there are multiple power levels determined, determining if the power levels are acceptable may include comparing each power level, ratio, etc., to a threshold. In one example, if at least one of the power levels is not acceptable, then it may be determined at the block 262 that the interfering power levels corresponding to this LO frequency are not acceptable.

If the power level is determined to be acceptable at the block 262, the flow may end and the receiver may operate using the selected LO frequency. But if the power level is not acceptable (as determined at the block 262), the flow may proceed to a block 266, at which the frequency of the LO is adjusted. Adjusting the frequency of the LO may comprise randomly or pseudo-randomly selecting an LO frequency from the set of possible LO frequencies. Also, this may comprise selecting a previously unselected LO frequency. As another example, adjusting the LO frequency may comprise selecting a next higher or next lower frequency in the set. As yet another example, adjusting the LO frequency may comprise incrementing or decrementing the LO frequency by a frequency step size.

Then, the flow may proceed to the block 258 to determine the power level(s) of the interfering signal(s) corresponding to the new LO frequency. In this way, the LO frequency is adjusted until an acceptable interfering power level is found.

In one possible variation of the method 250, it may be determined whether all possible LO frequencies have been tried in association with the block 266. Then, the flow may end if all of the possible LO frequencies have been tried and no acceptable interfering power level was found. Optionally, indications of the various power levels determined at the block 258 and/or the block 262 (e.g., a cumulative power level) along with the corresponding LO frequencies optionally may be stored. In yet another variation, an indication of a minimum power level determined at the block 258 and/or the block 262 and the corresponding LO frequency may be stored. Then, if the flow ends without having found an acceptable interfering power level, the LO frequency having the minimum interfering power level may be determined and the LO frequency may be set to this frequency. In this way, a reduced level of interference may be achieved.

Figure 4:
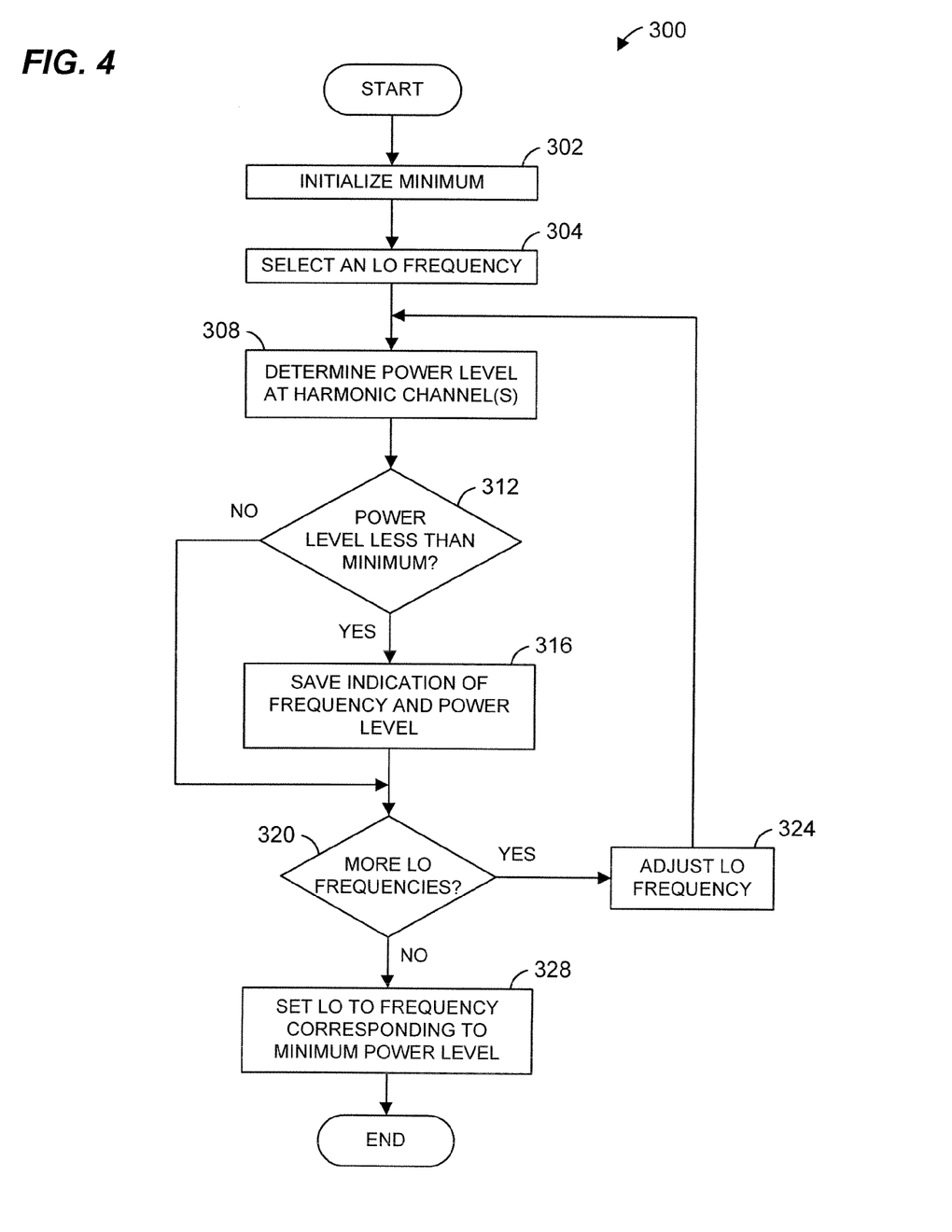
FIG. 4 is a flow diagram of another example method for determining a frequency of an LO of a receiver.

FIG. 4 is a flow diagram of another example method 300 for determining a frequency of the LO. At a block 302, an indication of a minimum power level may be initialized. For example, it may be set to a highest power level. At a block 304, an LO frequency may be selected. Selection of the LO frequency may be performed in a variety of ways including in the same way as or in a way similar to the block 254 of FIG. 3.

At a block 308, power levels of interfering signals that will be shifted down to the IF frequency as a result of harmonics of the selected LO signal are determined. There may be one or more such interfering signals corresponding to one or more harmonics. Determination of the power levels may be performed in a variety of ways including in the same way as or in a way similar to the block 258 of FIG. 3.

At a block 312, it may be determined if a power level determined at the block 308 is less than the minimum power level. This may include comparing a power level, cumulative power level, a ratio, etc., to the minimum power level. If multiple power levels are determined at the block 308 (for example, corresponding to multiple harmonics), a maximum of the multiple power levels may be compared to the minimum power level.

If at the block 312 it is determined that the power level is less than the minimum power level, then the flow may proceed to the block 316, at which the power level is selected as the new minimum power level. For example, an indication of the power level may be stored as the minimum power level. Also, an indication of the LO frequency may be stored. Then the flow may proceed to a block 320.

If at the block 312 it is determined that the power level is not less than the minimum power level, then the flow may proceed to the block 320. At the block 320, it may be determined if there are more possible LO frequencies to try. If there are more LO frequencies, the flow may proceed to a block 324, at which the LO frequency may be adjusted. Adjusting the LO frequency may be performed in a variety of ways including in the same way as or in a way similar to the block 266 of FIG. 3. Then, the flow may proceed back to the block 308.

If at the block 320 it is determined that there are no more LO frequencies, the flow may proceed to a block 328, at which the LO frequency may be set to the LO frequency corresponding to the minimum interfering power level. Then, the flow may end.

Figure 5:
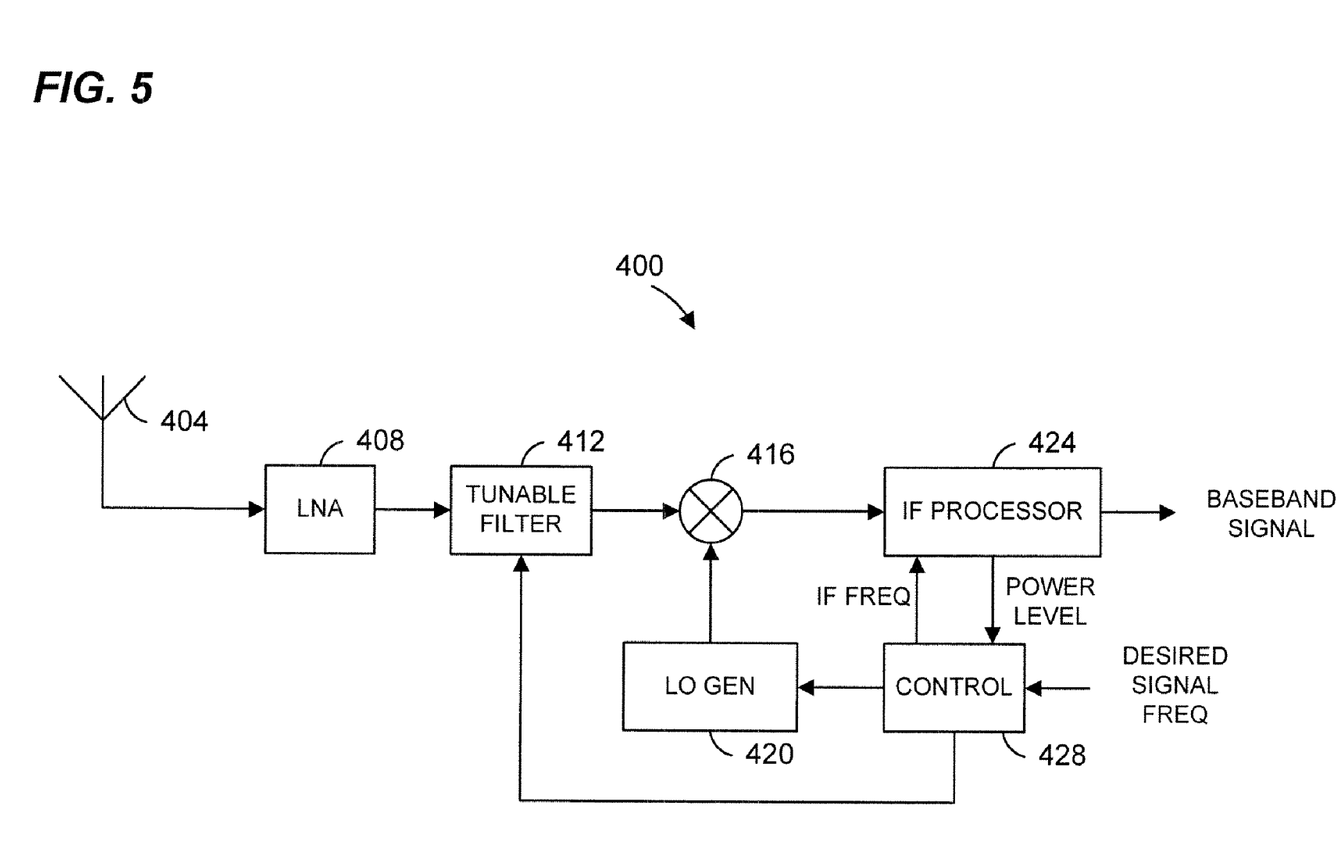
FIG. 5 is a block diagram of an example receiver that may implement the method of FIG. 3 and/or the method of FIG. 4.

FIG. 5 is a block diagram of an example receiver 400 that may implement a method such as the methods 250 and 300 of FIGS. 3 and 4, respectively. The receiver 400 includes an antenna 404 coupled to an input of a low noise amplifier (LNA) 408. An output of the LNA 408 may be coupled to an input of a tunable filter 412. In some implementations, the tunable filter 412 may be replaced with a non-tunable filter, such as a fixed filter.

An output of the filter 412 may be coupled to a first input of a mixer 416. A second input of the mixer 416 may be coupled to an output of a local oscillator (LO) generator 420. The LO generator 420 may generate an LO signal that is provided to the mixer 416. The LO signal may be square wave signal or some other suitable mixing signal. The LO signal may include harmonics as discussed above. The LO generator 420 may be or include a phase locked loop (PLL) device or some other suitable signal generator for generating a suitable mixing signal at a plurality of and/or a range of primary frequencies. The mixer 416 may down shift the filtered RF signal to generate an IF signal at an IF frequency. The IF frequency may be determined by the LO signal frequency. The mixer 416 may comprise a multiplier, for example.

An output of the mixer 416 may be coupled to an input of an intermediate frequency (IF) processor 424. The IF processor 424 processes the IF signal to generate a baseband signal from the output of the mixer 416. Additionally, the IF processor 424 may optionally generate a power level indicator that indicates the power level of a signal at the IF frequency. The power level indicator may be a power level measurement, for example. The IF processor 424 may receive an IF frequency indicator that indicates to which IF frequency the mixer 416 will down-shift signals.

The IF processor 424 may include circuitry for performing analog and/or digital signal processing to convert the received signal from the IF frequency to baseband, and the baseband signal may be an analog or a digital signal. Thus, the IF processor 424 may include analog and/or digital circuitry such as signal processing circuitry. In implementations in which the IF processor 424 implements digital signal processing, the IF processor 424 may include an analog-to-digital converter (ADC). Optionally, the IF processor 424 may include a programmable digital signal processor (e.g., programmable via firmware or software).

A controller 428 may be coupled to the LO generator 420 and the IF processor 424. If the IF processor 424 generates a power level indicator, this power level indicator may be provided to the controller 428. Thus, the controller 428 may include an input to receive the power level indicator from the IF processor 424. The controller 428 also may include an input to receive an indication of the frequency from which the desired signal is to be down-shifted (i.e., a pre-mixing frequency). The controller 428 may determine a range of or a plurality of LO signal frequencies that may be used to down-shift the desired signal from the pre-mixing frequency to a range of IF frequencies. This determination may include performing one or more calculations, retrieving data from a look-up table, etc.

The controller 428 may generate an IF frequency indicator that may be provided to the IF processor 424. The controller 428 may determine the IF frequency to which a signal will be shifted based on, for example, the pre-mixing frequency and the LO signal frequency. This determination may include performing one or more calculations, retrieving data from a look-up table, etc. Thus, the IF processor 424 may include an input to receive the IF frequency indicator. Also, the controller 428 generates a control signal that may be provided to the LO generator 420. Thus, the LO generator 420 may include an input to receive the control signal that controls the frequency of the LO signal. In some implementations, the IF frequency indicator and the control signal may be a single signal. Optionally, the power level indicator may be an error rate indicator generated by a decoder (not shown). Thus, the controller 428 may include an input to receive the error rate indicator.

If a tunable filter 412 is utilized, the controller 428 may be coupled to the tunable filter 412 and may provide a control signal to the filter. The control signal may control the passband of the filter 412, for example. Thus, the filter 412 may include an input to receive the control signal.

In operation, the LNA 408 amplifies RF signals received by the antenna 404. The output of the LNA 408 is filtered by the filter 412 and then shifted to an IF frequency by the mixer 416. The particular IF frequency to which the signal is down shifted is determined by frequency of the LO signal from the LO generator 420, and the controller 428 controls the frequency of the LO signal.

The IF processor 424 converts the IF signal (at the frequency indicated by the IF frequency indicator) to baseband to generate the baseband signal.

The controller 428 controls the frequency of the LO signal based on the power level indictor. For example, if the power level indictor indicates that a power level of an interfering signal is not acceptable, the controller 438 may cause the LO generator 420 to generate the LO signal at a different frequency. The controller 428 may cause the frequency of the LO signal to be adjusted in an attempt to reduce interference caused by one or more signals that are down shifted to the IF frequency as a result of one or more harmonics in the LO signal. The controller 428 may also cause the frequency of the LO signal to be adjusted in an attempt to measure power levels of various signals such as the desired signal and the interfering signals. For example, the controller 428 may first cause the frequency of the LO signal to be adjusted in order to measure a power level of the desired channel. Then, the controller 428 may cause the frequency of the LO signal to be adjusted in order to measure a power level of a harmonic channel.

As mentioned above, the receiver 400 optionally may implement the methods 250 and/or the method 300 of FIGS. 3 and 4, respectively. For example, with respect to the method 250 of FIG. 3, the controller 428 may select an LO frequency (block 254). At least a portion of the IF processor 424 and the controller 428 may determine the power level of one or more harmonic channels (block 258). For instance, the controller 428 may cause the LO generator 420 to generate an LO frequency such that the primary frequency component of the LO signal causes a desired signal (e.g., a desired channel) to be shifted to a first IF frequency. Then, a power estimation block (not shown) in the IF processor 424 may generate an estimate of the power level of the desired signal and provide it to the controller 424. Next, the controller 428 may cause the LO generator 420 to generate a different LO frequency such that the primary frequency component of the LO signal causes the interfering signal (e.g., a harmonic channel) to be shifted to a second IF frequency. Then, a power estimation block (not shown) in the IF processor 424 may generate an estimate of the power level of the interfering signal and provide it to the controller 424. In a similar manner, the controller 428 may cause the LO generator 420 to generate different LO frequencies such that the primary frequency component of the LO signal causes a plurality of different harmonic channels to be shifted to various IF frequencies. Then, the IF processor 424 may generate a plurality of estimates of the power levels of the different harmonic channels and provide them to the controller 424. The controller 424 may thus receive a plurality of power level estimates corresponding to the harmonic channels and may optionally generate a cumulative power level estimate corresponding to the plurality of the harmonic channels.

Additionally or alternatively, the controller 428 optionally may receive an error rate estimate for the desired signal and utilize the error rate of the desired signal to estimate the power level of the interfering signal and/or to determine whether the power level of the interfering signal is acceptable.

The controller 428 may then determine whether the power level of the interfering signal is acceptable (block 428). If it is acceptable, the controller 428 may cause the LO generator 420 to generate the LO signal at the appropriate frequency. If it is not acceptable, the controller 428 may control the LO generator 420 in an attempt to determine another LO signal frequency that results in an interfering signal with an acceptable power level.

With respect to the method 300 of FIG. 4, the controller 428 may initialize a minimum power level (block 302). Additionally, the controller 428 may select an LO frequency (block 304). At least a portion of the IF processor 424 and the controller 428 may determine the power level of one or more harmonic channels (block 308). Optionally, determining the power level may include receiving an error rate measurement.

The controller 248 may determine if the power level is less than the minimum power level (312). If the controller 248 determines that the power level is less than the minimum, the controller 248 may save an indication of the new minimum power level and the LO signal frequency to which it corresponds (block 316).

The controller 248 may determined if there are more LO frequencies to try (block 320). If there are more LO frequencies to try, the controller 248 may cause the LO generator 420 to generate an LO signal at a different frequency (block 324). If there are no more frequencies to try, the controller 248 may control the LO generator 420 to generate the LO signal having the frequency that corresponds to the minimum power level (block 328).

Of course, the methods 250 and 300 need not be implemented by the example receiver 400. Similarly, the receiver 400 may implement methods that are different than the method 250 and the method 300.

Methods and receivers such as the example methods and the example receiver described above may be utilized in a variety of communication devices that are capable of receiving signals across a wide band of frequencies. In such systems, it may be difficult to design and/or impractical to use a pre-mixing filter that is able to adequately attenuate harmonic interfering signals (e.g., harmonic channels). As just one example, the methods and/or receiver described above may be utilized in a television receiver, such as for a high-definition television.

Figure 6A:
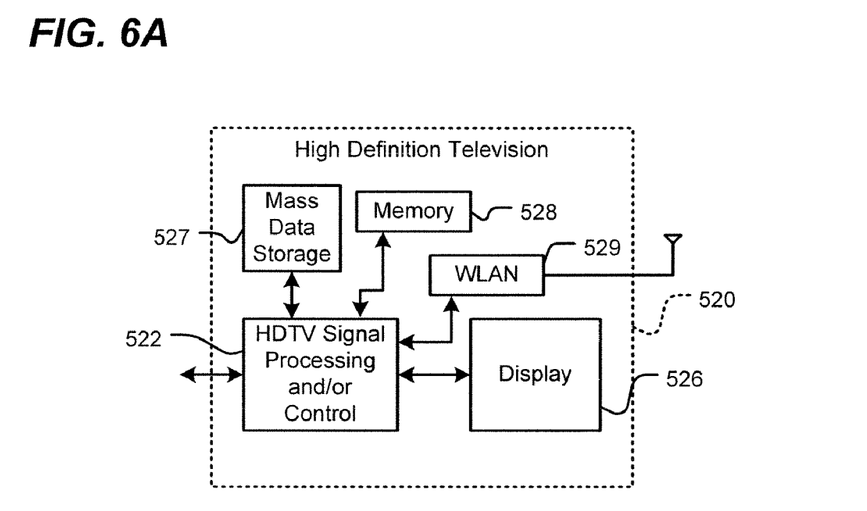
FIG. 6A is a block diagram of a high definition television that may utilize the method of FIG. 3, the method of FIG. 4, and/or the receiver of FIG. 5.

Referring now to FIG. 6A, a method such as the method 250 and/or the method 300 and/or a receiver such as the receiver 400 may be utilized in a high definition television (HDTV) 520. The HDTV 520 includes signal processing and/or control circuits, which are generally identified in FIG. 6A at 522, a WLAN interface 529, and a mass data storage 527. A method such as the method 250 and/or the method 300 and/or a receiver such as the receiver 400 may be utilized in the signal processing circuit and/or control circuit 522, for example. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perforin calculations, format data and/or perform any other type of HDTV processing that may be required.

HDTV 520 may communicate with mass data storage 527 that stores data in a nonvolatile manner such as optical and/or magnetic storage devices. The mass data storage 527 may include one or more hard disk drives (HDDs) and/or one or more digital versatile disks (DVDs). One or more of the HDDs may be a mini HDD that includes one or more platters having a diameter that is smaller than approximately 1.8"HDTV 520 may be connected to memory 528 such as RAM, ROM, low latency nonvolatile memory such as flash memory and/or other suitable electronic data storage. HDTV 520 also may support connections with a WLAN via a WLAN network interface 529.

Figure 6B:
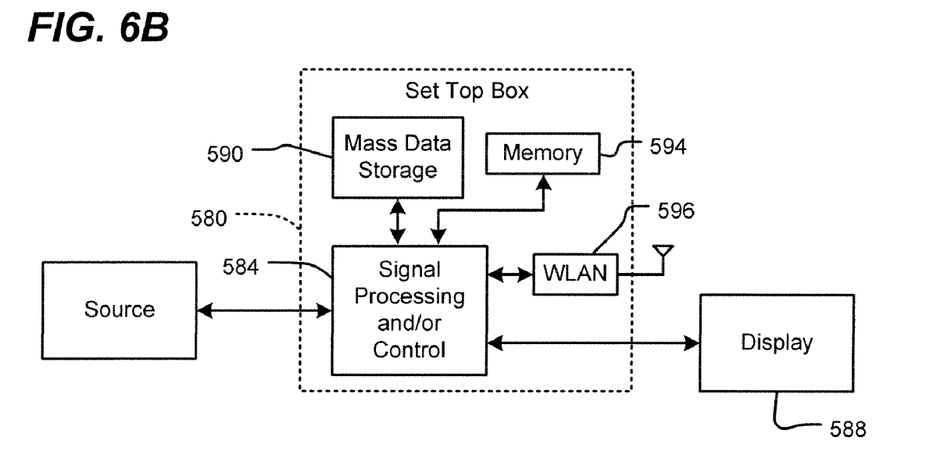
FIG. 6B is a block diagram of a set top box that may utilize the method of FIG. 3, the method of FIG. 4, and/or the receiver of FIG. 5.

Referring now to FIG. 6B, a method such as the method 250 and/or the method 300 and/or a receiver such as the receiver 400 may be utilized in a set top box 580. The set top box 580 includes signal processing and/or control circuits, which are generally identified in FIG. 6B at 584, a WLAN interface 596, and a mass data storage device 590. A method such as the method 250 and/or the method 300 and/or a receiver such as the receiver 400 may be utilized in the signal processing and/or control circuits 584, for example. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via a WLAN network interface 596.

At least some of the various blocks, operations, and techniques described above may be implemented in hardware, firmware, software, or any combination of hardware, firmware, and/or software. For example, whereas the LNA 408 will typically be implemented in hardware, the controller 428 may be implemented in hardware, firmware, software, or any combination of hardware, firmware, and/or software. Similarly, at least portions of the IF processor 424 may be implemented in hardware, firmware, software, or any combination of hardware, firmware, and/or software.

When a block or function is implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium).

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

The invention claimed is:

1. A method for setting a square wave local oscillator (LO) frequency in a receiver, the method comprising:
   a) selecting a frequency $f_{LO}$ of a square wave LO signal to downconvert a desired signal;
   b) determining a plurality of power levels of interfering signals corresponding to harmonics of a square wave LO signal, wherein determining power levels includes
   c) setting the frequency of the square wave LO signal to a frequency $Nf_{LO}$, wherein N is a positive integer greater than one, and
   d) measuring power of a downconverted signal when the frequency of the square wave LO signal is set to $Nf_{LO}$,
   e) repeating acts c and d for a plurality of values of N; and
   f) setting the frequency of the square wave LO signal to downconvert the desired signal based on the determined plurality of power levels of the interfering signals.

2. A method according to claim 1, further comprising:
   determining a power level of the desired signal, including
      setting the frequency of the square wave LO signal to the frequency $f_{LO}$, and
      measuring power of a downconverted signal when the frequency of the square wave LO signal is set to $f_{LO}$; and
   determining a ratio of the power level of the desired signal to a power level associated with the interfering signals;
   wherein setting the frequency of the square wave LO signal to downconvert the desired signal is based on the ratio.

3. A method according to claim 2, wherein setting the frequency of the square wave LO signal to downconvert the desired signal is based on a comparison of the ratio to a threshold.

4. A method according to claim 1, further comprising:
   determining a cumulative power level based on the plurality of power levels of the interfering signals;
   wherein setting the frequency of the square wave LO signal to downconvert the desired signal is based on the cumulative power level.

5. A method according to claim 4, further comprising:
   determining a power level of the desired signal, including
      setting the frequency of the square wave LO to the frequency $f_{LO}$, and
      measuring power of a downconverted signal when the frequency of the square wave LO signal is set to $f_{LO}$; and
   determining a ratio of the power level of the desired signal to the cumulative power level;
   wherein setting the frequency of the square wave LO signal to downconvert the desired signal is based on the ratio.

6. A method according to claim 1, further comprising determining whether one or more power levels corresponding to one or more interfering signals are acceptable, wherein the one or more interfering signals correspond to one or more harmonics of the square wave LO signal;
   wherein setting the frequency of the square wave LO signal to downconvert the desired signal comprises adjusting the frequency of the square wave LO signal if it is determined that the one or more power levels are not acceptable.

7. A method according to claim 1, wherein setting the frequency of the square wave LO signal to downconvert the desired signal comprises setting the frequency of the square wave LO signal to one frequency in a set of possible frequencies.

8. A method according to claim 1, further comprising:
   repeating acts a and b; and
   determining a frequency of the square wave LO signal corresponding to a minimum of interference;
   wherein setting the frequency of the square wave LO signal to downconvert the desired signal comprises setting the frequency of the square wave LO signal to the frequency corresponding to the minimum of interference.

9. A receiver device, comprising:
   a mixer having (i) a first input to receive a desired signal, (ii) a second input to receive a square wave local oscillator (LO) signal, and (iii) an output to provide an intermediate frequency (IF) signal;
   an LO signal generator to generate the square wave LO signal, wherein the LO signal generator is coupled to the second input of the mixer, the LO signal generator having a control input to control a frequency of the square wave LO signal; and
   a controller coupled to the control input of the LO signal generator, the controller having an input to receive a power level indicator, the controller to select a frequency of the square wave LO signal to downconvert the desired signal based on (i) a frequency of the desired signal and (ii) power levels of interfering signals corresponding to harmonics of the square wave LO signal, wherein the controller is configured to
      a) select a frequency $f_{LO}$ of the square wave LO signal to downconvert the desired signal;
      b) set the frequency of the LO signal generator to a frequency $Nf_{LO}$, wherein N is a positive integer greater than one,
      c) determine a power level of a downconverted signal when the frequency of the square wave LO signal is set to $Nf_{LO}$, and
      d) repeat acts b and c for a plurality of values of N to determine power levels of interfering signals corresponding to harmonics of the square wave LO signal.

10. A receiver device according to claim 9, wherein the power level indicator is a power level estimate.

11. A receiver device according to claim 9, wherein the controller is configured to select the frequency of the square wave LO signal to downconvert the desired signal further based on a power level estimate corresponding to the desired signal.

12. A receiver device according to claim 9, wherein the power level indicator is an error rate.

13. A receiver device according to claim 9, further comprising an intermediate frequency (IF) processor having an IF input coupled to the output of the mixer, the IF processor being configured to convert the IF signal to a baseband signal.

14. A receiver device according to claim 13, wherein the controller is configured to generate an indicator of a frequency to which the desired signal will be shifted by the mixer;
   wherein the IF processor is coupled to the controller and includes an input to receive the indicator of the frequency to which the desired signal will be shifted by the mixer.

15. A receiver device according to claim 13, wherein the IF processor is coupled to the controller and is configured to generate the power level indicator.

16. A receiver device according to claim 13, further comprising a low noise amplifier (LNA) having an output coupled to the first input of the mixer.

17. A receiver device according to claim 16, further comprising a filter coupled between the LNA and the mixer.

18. A receiver device according to claim 17, wherein the filter is a tunable filter.

19. A receiver device according to claim 18, wherein the controller is configured to generate a tunable filter control signal;
wherein the tunable filter is coupled to the controller and includes an input to receive the tunable filter control signal.

20. A receiver device according to claim 9, wherein the controller is configured to select the frequency of the square wave LO signal to downconvert the desired signal based on a cumulative power level of the interfering signals.

21. A receiver device according to claim 20, wherein the controller is configured to determining the cumulative power level based on a plurality of received power level indicators.

22. A receiver device according to claim 20, wherein the controller is configured to:
set the frequency of the square wave LO to the frequency $f_{LO}$,
receive a power level indicator corresponding to a downconverted signal when the frequency of the square wave LO signal is set to $f_{LO}$,
determine a ratio of a power level of the desired signal to the cumulative power level of interfering signals, and
set the frequency of the square wave LO signal to downconvert the desired signal based on the ratio.

23. A receiver device according to claim 9, wherein the controller is configured to:
repeat acts a, b, c, and d,
determine a frequency of the square wave LO signal corresponding to a minimum of interference, and
set the frequency of the square wave LO signal to downconvert the desired signal to a frequency corresponding to the minimum of interference.

24. A method for controlling a square wave local oscillator (LO) in a receiver, the method comprising:
a) receiving an indicator of a frequency of a desired signal;
b) setting a frequency of a square wave LO signal generated by the square wave LO to a frequency $Nf_{LO}$, wherein $f_{LO}$ is a frequency of the square wave LO signal to downconvert the desired signal, and wherein N is a positive integer greater than one;
c) receiving a power level indicator corresponding to a downconverted signal when the frequency of the square wave LO signal is set to $Nf_{LO}$;
d) repeating acts b and c for a plurality of values of N; and
e) determining frequency of the square wave LO signal to downconvert the desired signal based on the frequency of the desired signal and the plurality of power level indicators.

25. A method according to claim 24, further comprising:
setting the frequency of the square wave LO signal to the frequency $f_{LO}$, and
receiving a desired signal power level indicator corresponding to power of a downconverted signal when the frequency of the square wave LO signal is set to $f_{LO}$;
wherein determining the frequency of the square wave LO signal to downconvert the desired signal is further based on the desired signal power level indicator.

26. A method according to claim 25, further comprising:
determining a ratio of a power level of the desired signal to a power level associated with interfering signals corresponding to harmonics of the square wave LO signal;
wherein determining the frequency of the square wave LO signal is based on the ratio.

27. A method according to claim 24, wherein receiving the power level indicator includes receiving an error rate indicator;
wherein determining the frequency of the square wave LO signal to downconvert the desired signal is based on the error rate indicator.

28. A method according to claim 24, further comprising:
determining a cumulative power level based on the plurality of power level indicators;
wherein determining the frequency of the square wave LO signal to downconvert the desired signal is based on the cumulative power level.

29. A method according to claim 24, further comprising:
repeating acts b, c, and d; and
determining a frequency of the square wave LO signal corresponding to a minimum of interference;
wherein determining the frequency of the square wave LO signal to downconvert the desired signal comprises setting the frequency of the square wave LO signal to the frequency corresponding to the minimum of interference.

* * * * *